US012786037B2

(12) United States Patent
Park et al.

(10) Patent No.: US 12,786,037 B2
(45) Date of Patent: Nov. 3, 2026

(54) QAM TRANSMITTER WITH IMPROVED POWER EFFICIENCY AND WIRELESS COMMUNICATION DEVICE EQUIPPED WITH THE SAME

(71) Applicant: Dongguk University Industry-Academic Cooperation Foundation, Seoul (KR)

(72) Inventors: Jung Dong Park, Gyeongsangbuk-do (KR); Jeongmoon Song, Gyeonggi-do (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 23 days.

(21) Appl. No.: 18/981,922

(22) Filed: Dec. 16, 2024

(65) Prior Publication Data

US 2025/0211477 A1 Jun. 26, 2025

(30) Foreign Application Priority Data

Dec. 22, 2023 (KR) ........................ 10-2023-0190217

(51) Int. Cl.
*H04L 27/36* (2006.01)
*H04L 27/18* (2006.01)

(52) U.S. Cl.
CPC ............ *H04L 27/364* (2013.01); *H04L 27/18* (2013.01); *H04L 27/362* (2013.01)

(58) Field of Classification Search
CPC ...... H03F 1/3211; H03F 1/3252; H04L 27/10; H04L 27/12; H04L 27/18; H04L 27/20;
(Continued)

(56) References Cited

U.S. PATENT DOCUMENTS 5,815,531 A * 9/1998 Dent ..................... H04L 27/362 375/297
6,201,452 B1 * 3/2001 Dent ................... H04L 27/2071 363/43
(Continued)

FOREIGN PATENT DOCUMENTS

KR 10-1050928 B1 7/2011
KR 10-1590267 B1 2/2016

OTHER PUBLICATIONS

Office action issued on Sep. 30, 2025 from Korean Patent Office in a counterpart Korean Patent Application No. 10-2023-0190217 (all the cited references are listed in this IDS.) (English translation is also submitted herewith.).

*Primary Examiner* — Young T. Tse
(74) *Attorney, Agent, or Firm* — The PL Law Group, PLLC

(57) ABSTRACT

A quadrature amplitude modulation (QAM) transmitter according to an embodiment includes a first quadrature phase shift keying (QPSK) generator configured to generate a first QPSK signal, a second QPSK generator configured to generate a second QPSK signal, a first amplifier configured to receive the first QPSK signal, amplify power thereof, and output the power amplified first QPSK signal, a second amplifier configured to receive the second QPSK signal, amplify power thereof, and outputs the power amplified second QPSK signal, and a power combining unit configured to synthesize a QAM signal by combining the first QPSK signal output from the first amplifier and the second QPSK signal output from the second amplifier at a terminating end.

5 Claims, 5 Drawing Sheets

(58) Field of Classification Search
CPC ............. H04L 27/2003; H04L 27/2053; H04L 27/206; H04L 27/34; H04L 27/36; H04L 27/362; H04L 27/364
USPC ....... 375/261, 267–269, 272, 275, 279, 281, 375/283, 297–300, 303, 308; 330/84, 98, 330/126, 200, 294; 332/103, 144, 145, 332/149, 151; 455/102, 103, 108, 114.3, 455/127.3
See application file for complete search history.

(56) References Cited

U.S. PATENT DOCUMENTS

| | | | | |
|---|---|---|---|---|
| 6,889,034 | B1 * | 5/2005 | Dent | H01Q 5/50 455/121 |
| 7,078,981 | B2 * | 7/2006 | Farag | H04L 5/12 375/298 |
| 2010/0303172 | A1 * | 12/2010 | Zolfaghari | H04L 27/0008 375/295 |
| 2021/0014796 | A1 * | 1/2021 | Cho | H04W 52/243 |
| 2025/0247278 | A1 * | 7/2025 | Bigdeli | H04L 27/20 |

* cited by examiner

| Band | 3G | 4G | 4.5G |
|---|---|---|---|
| Constellation |  |  |  |
| $RF_{Tx} = LO_{Tx}$ | 140 GHz | 140 GHz | 140 GHz |
| $LO_{SAX}$ | 131 GHz | 132 GHz | 132 GHz |
| EVM | -22.57 dB | -23.7 dB | -21.44 dB |
| Data Rate | 12 Gbps | 16 Gbps | *18 Gbps |

QAM TRANSMITTER WITH IMPROVED POWER EFFICIENCY AND WIRELESS COMMUNICATION DEVICE EQUIPPED WITH THE SAME

CROSS-REFERENCE TO RELATED APPLICATION AND CLAIM OF PRIORITY

This application claims the benefit under 35 USC § 119(a) of Korean Patent Application No. 10-2023-0190217, filed on Dec. 22, 2023, in the Korean Intellectual Property Office, the entire disclosure of which is incorporated herein by reference for all purposes.

BACKGROUND

1. Technical Field

Embodiments of the present disclosure relate to a quadrature amplitude modulation (QAM) transmitter and a wireless communication device equipped with the same.

2. Description of Related Art

Quadrature amplitude modulation (QAM) is one of the high-speed modulation schemes widely used in digital communication, and is a modulation scheme that uses amplitude and phase simultaneously. QAM is implemented by using two orthogonal carrier waves (sine and cosine waves) that have the same frequency and are 90 degrees out of phase with each other, modulating each carrier wave component using an amplitude shift keying (ASK) scheme, and synthesizing the carrier waves. Bits representing digital data are modulated with various amplitudes and phases by these carrier waves, and a plurality of bits can be transmitted simultaneously through this modulation. Meanwhile, conventional high-order QAM transmitters have a problem in that the power amplifier thereof operates in a linear region, which reduces the efficiency of the transmitter.

Examples of the related art include Korean Patent Registered Publication No. 10-1050928 (Jul. 20, 2011).

SUMMARY

Embodiments of the present disclosure are intended to provide a QAM transmitter with improved power efficiency and a wireless communication device equipped with the same.

A QAM transmitter according to an embodiment of the preset disclosure includes a first quadrature phase shift keying (QPSK) generator configured to generate a first QPSK signal, a second QPSK generator configured to generate a second QPSK signal, a first amplifier configured to receive the first QPSK signal, amplify power thereof, and output the power amplified first QPSK signal, a second amplifier configured to receive the second QPSK signal, amplify power thereof, and outputs the power amplified second QPSK signal, and a power combining unit configured to synthesize a QAM signal by combining the first QPSK signal output from the first amplifier and the second QPSK signal output from the second amplifier at a terminating end.

The first QPSK generator may include a first real component generator configured to generate a real component of the first QPSK signal and a first imaginary component generator configured to generate an imaginary component of the first QPSK signal, and the second QPSK generator may include a second real component generator configured to generate a real component of the second QPSK signal and a second imaginary component generator configured to generate an imaginary component of the second QPSK signal.

The first QPSK signal and the second QPSK signal may be independent signals and may be generated to respectively have a preset reference magnitude.

Each of the first amplifier and the second amplifier may be configured to operate in a saturation region to amplify output power of each QPSK signal of which information is transmitted only through a phase of a carrier wave.

Each of the first QPSK signal and the second QPSK signal may be generated to have a reference magnitude in which each of coefficients of the real component and the imaginary component is 1.

The first amplifier may be configured to output a first QPSK signal having a first saturation power, and the second amplifier may be configured to output a second QPSK signal having a second saturation power, and the magnitude of the second saturation power may be four times the magnitude of the first saturation power.

The first amplifier may include one power amplification unit, and the power amplification unit may have a gain preset so that the first amplifier outputs the first saturation power.

The second amplifier may include a divider configured to split the second QPSK signal, four power amplification units each of which is configured to receive the second QPSK signal from the divider, and a combiner configured to synthesize the second QPSK signals of first saturation power each of which is output from each of the four power amplification units, and output the second QPSK signal having four times the first saturation power.

The power combining unit may synthesize a 16-QAM signal by combining the power of a first QPSK signal of the first saturation power and a second QPSK signal of the second saturation power which is four times the magnitude of the first saturation power.

The power combining unit may include a first antenna connected to an output end of the first amplifier and transmitting the first QPSK signal of the first saturation power and a second antenna connected to an output end of the second amplifier and transmitting the second QPSK signal of the second saturation power, and the power combining unit may synthesize a 16-QAM signal by combining the transmitted first QPSK signal and second QPSK signal in space.

A QAM transmitter according to another embodiment of the preset disclosure includes a first QPSK generator configured to generate a first quadrature phase shift keying (QPSK) signal having a preset reference magnitude, a second QPSK generator configured to generate a second QPSK signal having the reference magnitude, a first amplifier configured to receive the first QPSK signal, amplify power thereof, and output the power amplified signal, but operate in a saturation region, a second amplifier configured to receive the second QPSK signal, amplify power thereof, and output the power amplified signal, but operate in a saturation region, and a power combining unit configured to synthesize a quadrature amplitude modulation (QAM) signal by combining the first QPSK signal output from the first amplifier and the second QPSK signal output from the second amplifier at a terminating end.

The first amplifier may be configured to output a first QPSK signal having a first saturation power, and the second amplifier may be configured to output a second QPSK signal having a second saturation power, and the magnitude of the second saturation power may be four times the magnitude of the first saturation power.

The power combining unit may synthesize a 16-QAM signal by combining power of the first QPSK signal of the first saturation power and the second QPSK signal of the second saturation power which is four times the magnitude of the first saturation power.

The power combining unit may include a first antenna connected to an output end of the first amplifier and transmitting the first QPSK signal having the first saturation power, and a second antenna connected to the output end of the second amplifier and transmitting the second QPSK signal of the second saturation power, and the power combining unit may synthesize a 16-QAM signal by combining the transmitted first QPSK signal and second QPSK signal in space.

A high-order QAM transmitter according to another embodiment of the present disclosure include M quadrature phase shift keying (QPSK) generators each of which is configured to generate an independent QPSK signal, M amplifiers each of which is configured to receive an independent QPSK signal, amplify the power thereof, and output a preset saturation power, and a power combining unit configured to synthesize a quadrature amplitude modulation (QAM) signal by combining M QPSK signals that respectively from the M amplifiers at a terminating end, and each of the M amplifiers may be set to output a saturation power of $4^k$ (k=0, 1, . . . , M−1).

DETAILED DESCRIPTION

Hereinafter, specific embodiments of the present disclosure will be described with reference to the drawings. The following detailed description is provided to help a comprehensive understanding of the methods, devices, and/or systems described in this specification. However, this is merely an exemplary, and the present disclosure is not limited thereto.

In describing embodiments of the present disclosure, when it is determined that a detailed description of a known technology related to the present disclosure may unnecessarily obscure the gist of the present disclosure, the detailed description will be omitted. The terms described below are terms defined in consideration of the functions in the present disclosure, and may vary depending on the intention or custom of the user or operator. Therefore, the definition should be made based on the contents throughout this specification. The terms used in the detailed description are only for describing embodiments of the present disclosure and should never be limited. Unless clearly used otherwise, the singular form includes the plural form. In this description, expressions such as “including” or “having” are intended to indicate certain characteristics, numbers, steps, operations, elements, parts or combinations thereof, and should not be construed to exclude the existence or possibility of one or more other characteristics, numbers, steps, operations, elements, parts or combinations thereof other than those described.

Meanwhile, directional terms such as upper side, lower side, one side, the other side, etc. are used in relation to the orientation of the disclosed drawings. Since the components of the embodiments of the present disclosure can be positioned in various orientations, the directional terms are used for illustrative purposes and are not intended to be limiting.

In addition, terms such as first, second, etc. may be used to describe various components, but the components should not be limited by the terms. The terms may be used to distinguish one component from another. For example, without departing from the scope of the present disclosure, a first component may be named a second component, and similarly, a second component may also be named a first component.

Figure 1:
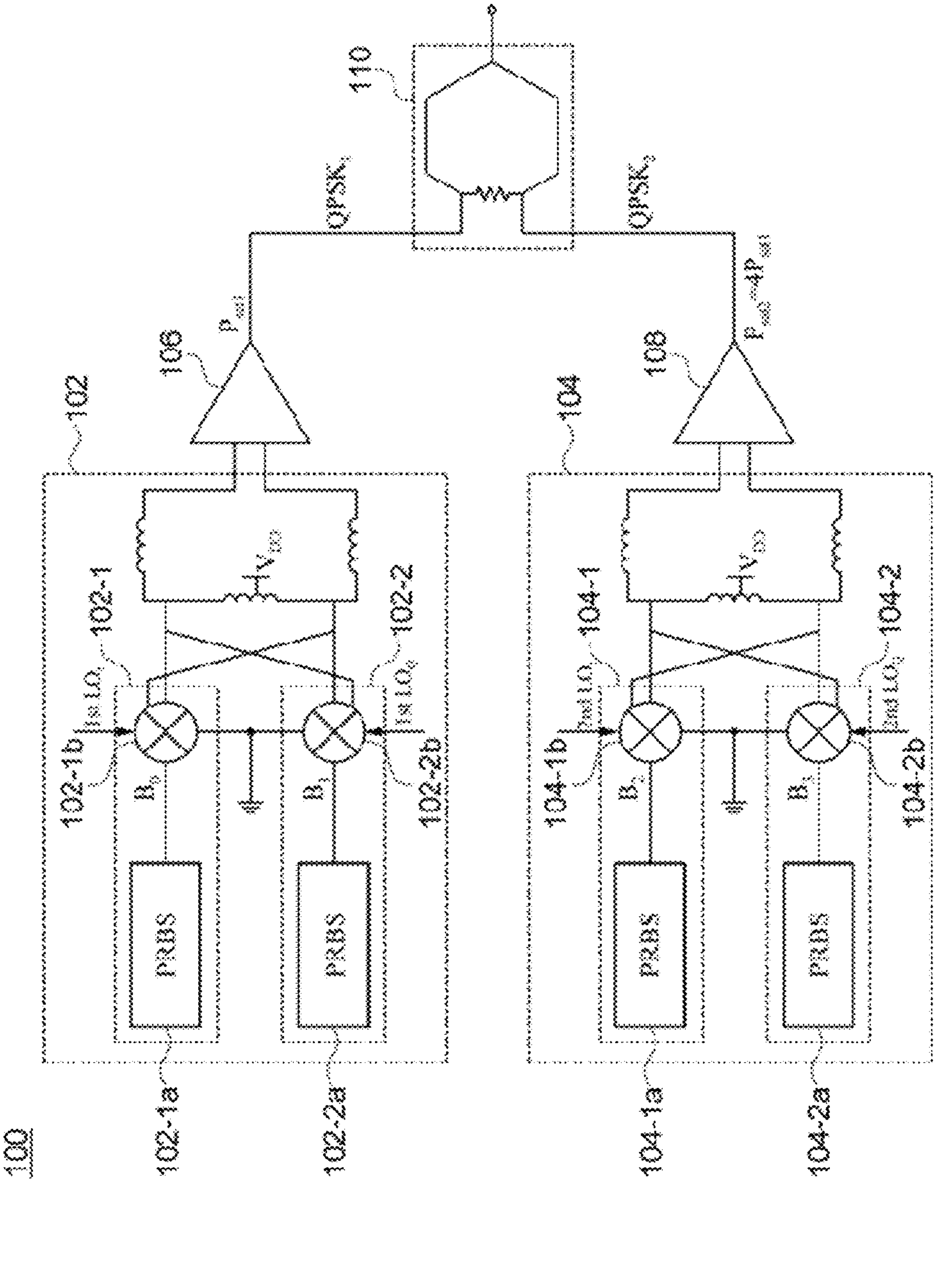
FIG. 1 is a schematic diagram showing a structure of a quadrature amplitude modulation (QAM) transmitter according to an embodiment of the present disclosure.

FIG. 1 is a schematic diagram showing a structure of a quadrature amplitude modulation (QAM) transmitter according to an embodiment of the present disclosure.

Referring to FIG. 1, a QAM transmitter 100 may include a first quadrature phase shift keying (QPSK) generator 102, a second QPSK generator 104, a first amplifier 106, a second amplifier 108, and a power combining unit 110.

The first QPSK generator 102 may generate a first QPSK signal. In an embodiment, the first QPSK generator 102 may include a first real component generator 102-1 and a first imaginary component generator 102-2. The first real component generator 102-1 may generate a real component (i.e., an I component) of the first QPSK signal. The first real component generator 102-1 may generate the first real component by mixing a first bit $B_0$ generated from a first pseudo random binary sequence (PRBS) 102-1*a* and a first local oscillator (LO) signal through a first mixer 102-1*b*.

The first imaginary component generator 102-2 may generate an imaginary component (i.e., Q component) of the first QPSK signal. The first imaginary component generator 102-2 may generate the first imaginary component by mixing a second bit B1 generated from a second PRBS 102-2*a* and a first LOQ signal through a second mixer 102-2*b*.

Figure 4:
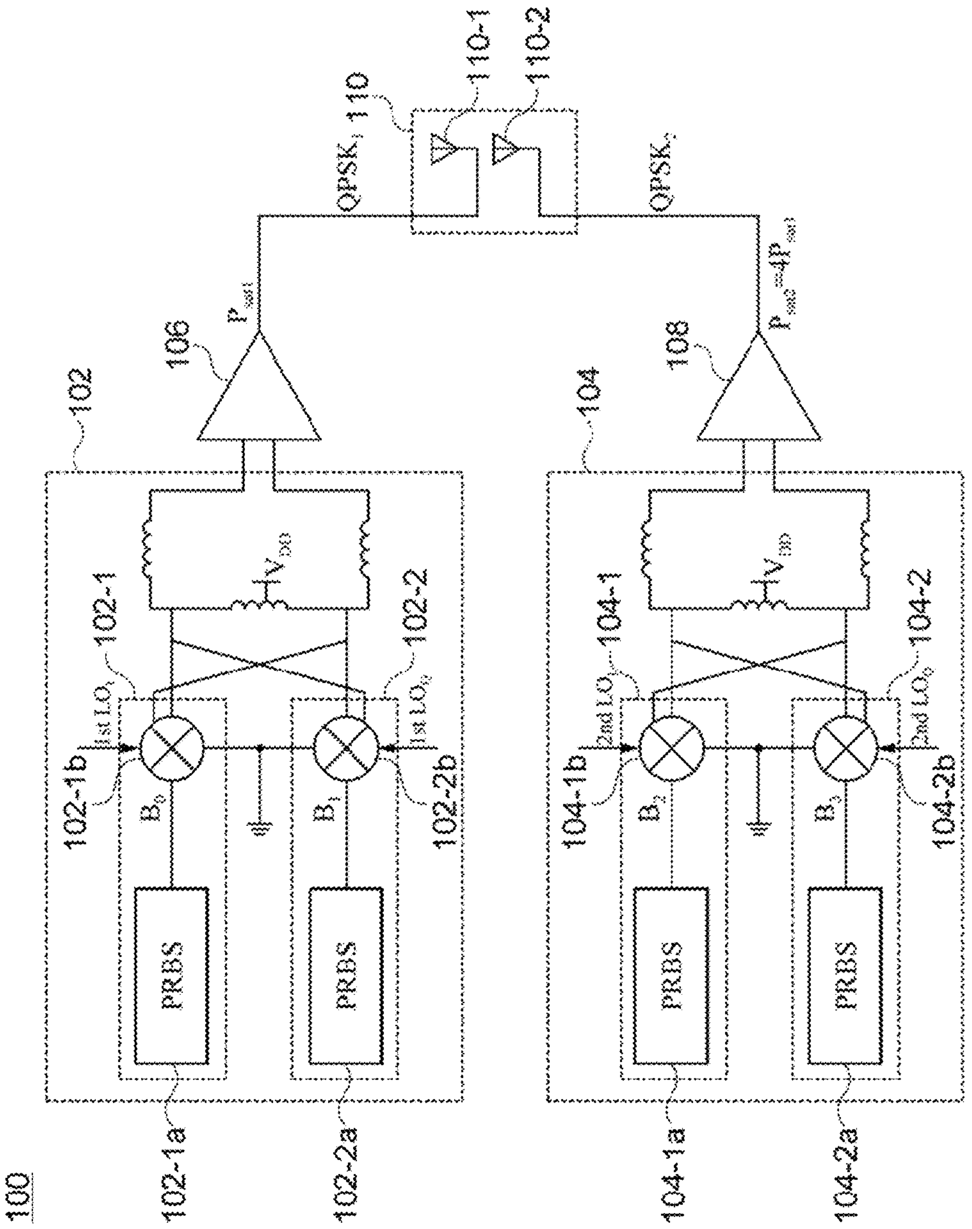
FIG. 4 is a schematic diagram showing a structure of a QAM transmitter according to another embodiment of the present disclosure.

The first QPSK generator 102 synthesizes the first real component output from the first mixer 102-1*b* and the imaginary component output from the second mixer 102-2*b* to generate the first QPSK signal (QPSK1=I1+jQ1) for input to the first amplifier 106. The block element depicted between the outputs of the first mixer 102-1*b* and the second mixer 102-2*b* and the input of the first amplifier 106 in FIGS. 1 and 4 represents this synthesis operation within the first QPSK generator 102.

The first QPSK generator 102 may generate a first QPSK signal by synthesizing the first real component and the first imaginary component, and input the generated first QPSK signal to the first amplifier 106. The first QPSK signal may have a preset reference magnitude. For example, the first QPSK signal may have a reference magnitude in which each of coefficients of a first real component $I_1$ and a first imaginary component $Q_1$ is 1. That is, the first QPSK signal may be expressed as $QPSK_1=I_1+jQ_1$. In this case, the first QPSK signal may be understood as having only a phase component.

The second QPSK generator 104 may generate a second QPSK signal. The second QPSK signal may be a signal independent of the first QPSK signal and having the same magnitude as the first QPSK signal. In an embodiment, the second QPSK generator 104 may include a second real component generator 104-1 and a second imaginary component generator 104-2.

The second real component generator 104-1 may generate a real component (i.e., an I component) of the second QPSK signal. The second real component generator 104-1 may generate the second real component by mixing a third bit B2 generated from a third PRBS 104-1*a* and a second LOI signal through a third mixer 104-1*b*.

The second imaginary component generator 104-2 may generate an imaginary component (i.e., a Q component) of the second QPSK signal. The second imaginary component generator 104-2 may generate the second imaginary component by mixing a fourth bit B3 generated from a fourth PRBS 104-2*a* and a second LOQ signal through a fourth mixer 104-2*b*.

Similarly, the second QPSK generator 104 synthesizes the second real component output from the third mixer 104-1*b* and the imaginary component output from the fourth mixer 104-2*b* to generate the second QPSK signal (QPSK2=I2+jQ2) for input to the second amplifier 108. The block element depicted between the outputs of the third mixer 104-1*b* and the fourth mixer 104-2*b* and the input of the second amplifier 108 in FIGS. 1 and 4 represents this synthesis operation within the second QPSK generator 104.

The second QPSK generator 104 may generate the second QPSK signal by synthesizing the second real component and the second imaginary component, and input the generated second QPSK signal to the second amplifier 108. The second QPSK signal may have a preset reference magnitude. For example, the second QPSK signal may have a reference magnitude in which each of coefficients of a second real component 12 and a second imaginary component $Q_2$ is 1. That is, the second QPSK signal may be expressed as $QPSK_2=I_2+jQ_2$. In this case, the second QPSK signal may be understood as having only a phase component.

That is, in the disclosed embodiment, in order to implement a 16-QAM high-efficiency transmitter, the first QPSK signal and the second QPSK signal that are independent and have the same reference magnitude are input to the first amplifier 106 and the second amplifier 108, respectively.

The first amplifier 106 and the second amplifier 108 are provided to operate in a saturation region, respectively. Here, since the first QPSK signal and the second QPSK signal are independent signals and have only a phase component as a reference magnitude, the first amplifier 106 and the second amplifier 108 may be operated in a saturation region. That is, the first amplifier 106 and the second amplifier 108 may be provided to operate in the saturation region, respectively, in order to amplify output power of each QPSK signal of which information is transmitted only through the phase of the carrier wave.

In an embodiment, the first amplifier 106 may be provided to have first saturation power $P_{sat1}$. In this case, when the first QPSK signal is input to the first amplifier 106, the first amplifier 106 may operate in a saturation region, and thus the first QPSK signal having the first saturation power $P_{sat1}$ is output.

The second amplifier 108 may be provided to have second saturation power $P_{sat2}$. The second saturation power $P_{sat2}$ may be $4^{M-1}$ times (M is a natural number greater than or equal to 2) the magnitude of the first saturation power $P_{sat1}$. For example, the second saturation power $P_{sat2}$ may be 4 times (M=2) the magnitude of the first saturation power $P_{sat1}$. In this case, when the second QPSK signal is input to the second amplifier 108, the second amplifier 108 may operate in the saturation region, and thus the second QPSK signal having four times the first saturation power $P_{sat1}$ is output. In this case, the difference in output saturation power between the second amplifier 108 and the first amplifier 106 is 6 dB.

Figure 2:
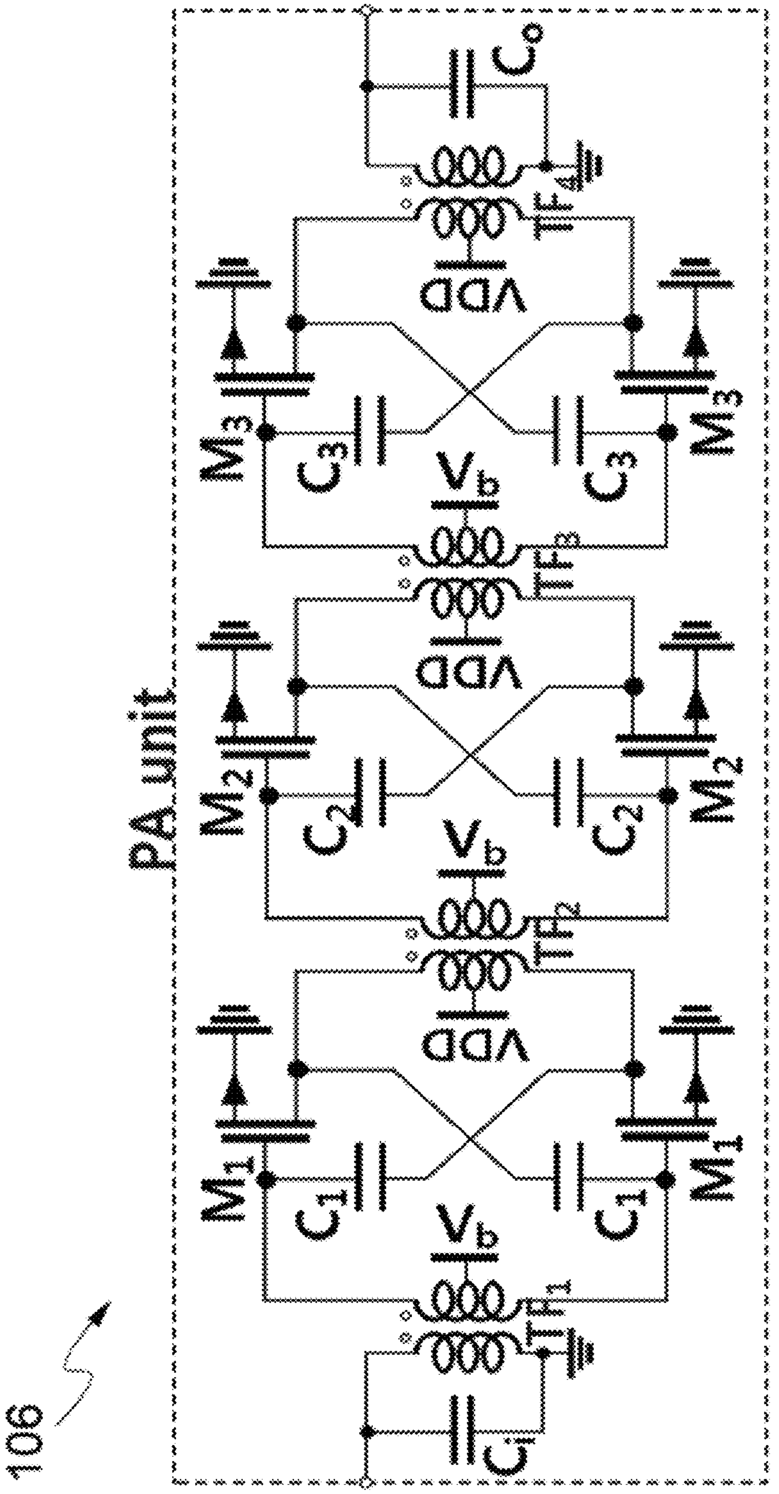
FIG. 2 is a circuit diagram showing a first amplifier according to an embodiment of the present disclosure.
Figure 3:
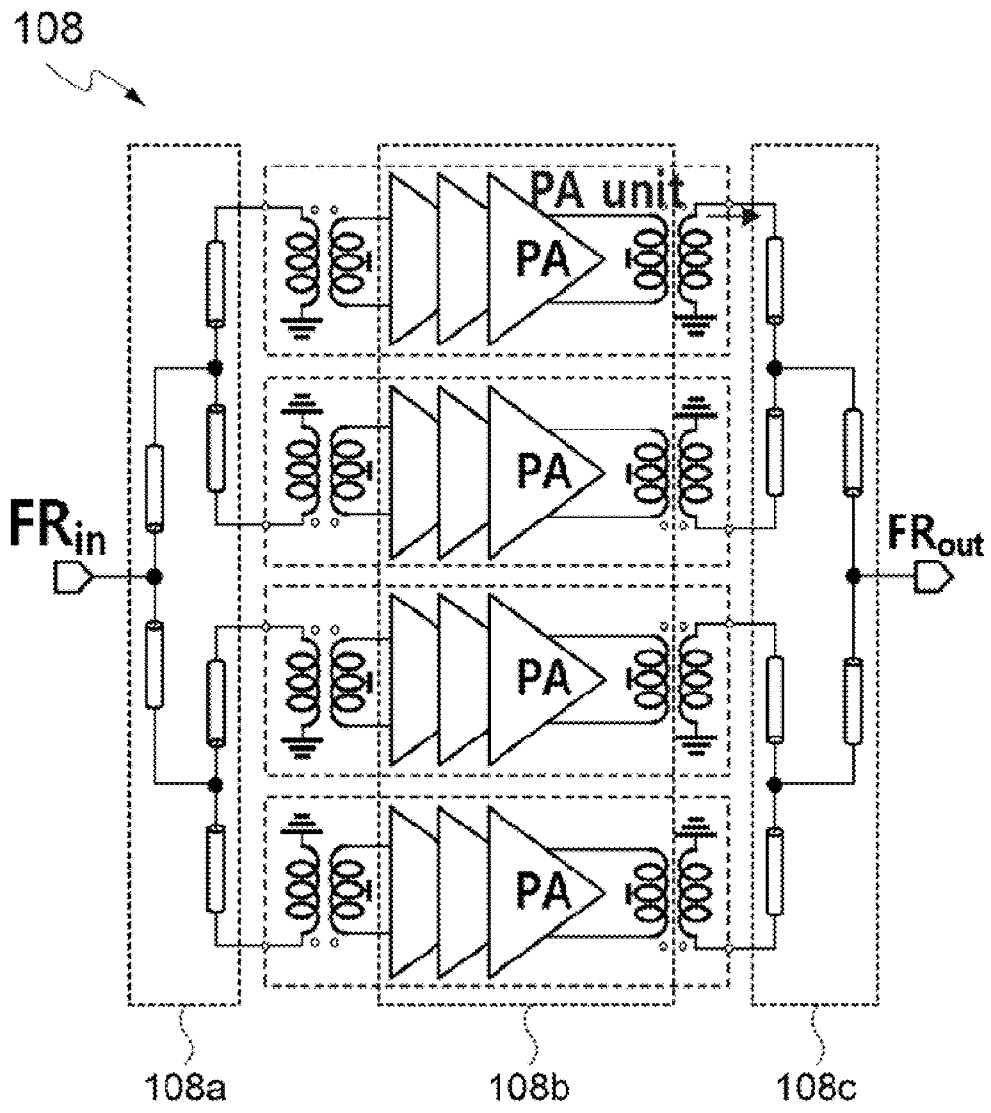
FIG. 3 is a circuit diagram showing a second amplifier according to an embodiment of the present disclosure.

FIG. 2 is a circuit diagram showing the first amplifier 106 in an embodiment of the present invention, and FIG. 3 is a circuit diagram showing the second amplifier 108 in an embodiment of the present invention.

First, referring to FIG. 2, the first amplifier 106 includes one power amplification unit (PA unit). The PA unit may be provided to have a preset gain so that the first amplifier 106 outputs the first saturation power $P_{sat1}$. The configuration of the PA unit may utilize a previously known power amplifier, and thus a detailed description thereof will be omitted.

Referring to FIG. 3, the second amplifier 108 may include a divider 108*a*, four PA units 108*b*, and a combiner 108*c*.

The divider 108*a* may split the input second QPSK signal and respectively input the split second QPSK signals into four PA units 108*b*. Each of the four power amplification units 108*b* may be provided to have a preset gain so that the first saturation power $P_{sat1}$ is output. That is, each of the four PA units 108*b* of the second amplifier 108 may be provided in the same manner as the PA unit of the first amplifier 106. In this case, each of the four PA units 108*b* outputs a second QPSK signal having the first saturation power $P_{sat1}$.

The combiner 108*c* may synthesize the second QPSK signals of the first saturation power Psat1 each of which is output from each of the four PA units 108*b*. Then, the combiner 108*c* outputs the second QPSK signal having four times the magnitude of the first saturation power Psat1.

The power combining unit 110 may transmit a 16-QAM signal by combining the power of the first QPSK signal output from the first amplifier 106 and second QPSK signal output from the second amplifier 108. In an embodiment, the power combining unit 110 may be a power combiner.

For example, when the first amplifier 106 outputs the first QPSK signal of the first saturation power Psat1 and the second multiplier 108 outputs the second QPSK signal having four times the first saturation power Psat1, the power combining unit 110 may synthesize a 16-QAM signal by combining the first QPSK signal and the second QPSK signal.

Here, the power combining unit 110 is described as a power combiner as an example, but is not limited thereto. As illustrated in FIG. 4, the power combining unit 110 may include a first antenna 110-1 connected to the first amplifier 106 and a second antenna 110-2 connected to the second amplifier 108.

In this case, the first antenna 110-1 and the second antenna 110-2 may synthesize the 16-QAM signal by combining the first QPSK signal output from the first amplifier 106 and the second QPSK signal output from the second amplifier 108 in space.

Meanwhile, this structure may be extended in the same way to implement higher-order QAM than 16-QAM. For example, when there are M independent QPSK signals, the order of N-order QAM implemented becomes $N=4^M$. In this time, in order to configure higher-order QAM, the magnitude of the power of each QPSK may be set to have a magnitude of $2^k$, (k=0, 1, . . . , M−1) when the magnitude of the minimum QPSK signal is 1. For example, when M=3, the magnitudes of three independent QPSK signals may be set to 1, 2, and 4, respectively, to implement 64-QAM. From the above, when power amplifiers drive antennas or ports of the power combining units having the same resistance as the load R, the magnitudes of the saturation power of the required power amplifiers may be respectively set to $4^k$, (where k=0, 1, . . . , M−1).

Figure 5:
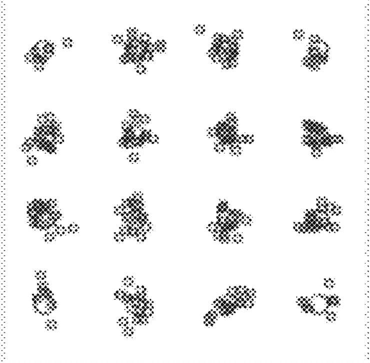
FIG. 5 is a diagram showing the constellation of 16-QAM signals according to a modulation rate (Baud) according to an embodiment of the present disclosure.
Figure 5:
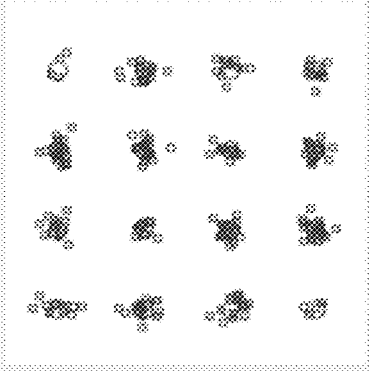
Figure 5:
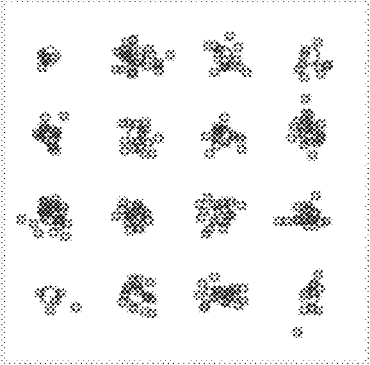

FIG. 5 is a diagram showing the constellation of 16-QAM signals according to a modulation rate (Baud) according to an embodiment of the present disclosure. Referring to FIG. 5, it can be seen that the 16-QAM signal is well displayed according to each modulation rate.

According to the disclosed embodiment, since the first amplifier and the second amplifier may operate in the saturation region by inputting the first QPSK signal and the second QPSK signal that are mutually independent and have the same reference to the first amplifier 106 and the second amplifier 108, respectively, and output the first QPSK signal having first saturation power $P_{sat1}$ and the second QPSK signal having second saturation power $P_{sat2}$, the power efficiency of the 16-QAM transmitter can be increased.

According to the disclosed embodiment, since a method in which power of respective QPSK signals is combined through an antenna or a power combining unit after the first amplifier and the second amplifier operate in the saturation region by inputting the first QPSK signal and the second QPSK signal that are mutually independent and have the same reference size to the first amplifier and the second amplifier, respectively, and outputting the first QPSK signal having first saturation power $P_{sat1}$ and the second QPSK signal having second saturation power $P_{sat2}$, the power efficiency of the high-order QAM transmitter can be greatly increased compared to a conventional high-order QAM transmitter in which a linear power amplifier is used by considering both magnitude and phase information.

Although representative embodiments of the present invention have been described in detail above, those skilled in the art will understand that various modifications may be made to the above-described embodiments without departing from the scope of the present invention. Therefore, the scope of the rights of the present disclosure should not be limited to the described embodiments, but should be determined by the claims described below as well as equivalents of the claims.

What is claimed is:

1. A quadrature amplitude modulation (QAM) transmitter comprising:

a first quadrature phase shift keying (QPSK) generator comprising a first real component generator configured to generate a real component of a first QPSK signal and a first imaginary component generator configured to generate an imaginary component of the first QPSK signal, wherein the first QPSK signal has a preset reference magnitude in which each of coefficients of the real component and the imaginary component is 1;

a second QPSK generator comprising a second real component generator configured to generate a real component of a second QPSK signal and a second imaginary component generator configured to generate an imaginary component of the second QPSK signal, wherein the second QPSK signal has the preset reference magnitude in which each of coefficients of the real component and the imaginary component is 1, and wherein the first QPSK signal and the second QPSK signal are independent signals;

a first amplifier configured to receive the first QPSK signal, amplify power thereof, and output the power amplified first QPSK signal at a first saturation power, the first amplifier being configured to operate in a saturation region, and the first amplifier comprising one power amplification unit having a gain preset so that the first amplifier outputs the first QPSK signal at the first saturation power;

a second amplifier configured to receive the second QPSK signal, amplify power thereof, and output the power-amplified second QPSK signal at a second saturation power that is four times the magnitude of the first saturation power, the second amplifier being configured to operate in a saturation region, the second amplifier comprising:

a divider configured to split the second QPSK signal;

four power amplification units each configured to receive the second QPSK signal split by the divider and output the received second QPSK signal at the first saturation power; and a combiner configured to synthesize the second QPSK signals respectively output from the four power amplification units and to output the synthesized second QPSK signal at the second saturation power; and a power combining unit configured to synthesize a 16-QAM signal by combining the first QPSK signal output from the first amplifier at the first saturation power and the second QPSK signal output from the second amplifier at the second saturation power at a terminating end.

2. The QAM transmitter of claim 1, wherein the power combining unit comprises:

a first antenna connected to an output end of the first amplifier and configured to transmit the first QPSK signal at the first saturation power; and a second antenna connected to an output end of the second amplifier and configured to transmit the second QPSK signal at the second saturation power, and wherein the power combining unit synthesizes the 16-QAM signal by combining the transmitted first QPSK signal and the transmitted second QPSK signal in space.

3. A wireless communication device comprising the QAM transmitter as claimed in claim 1.

4. A high-order quadrature amplitude modulation (QAM) transmitter comprising:

M quadrature phase shift keying (QPSK) generators each configured to generate an independent QPSK signal, wherein M is a natural number greater than or equal to 2;

M amplifiers each configured to receive a respective one of the M independent QPSK signals, amplify power thereof, and output a preset saturation power proportional to $4^k$ relative to a reference saturation power, where k=0, 1, . . . , M−1; and a power combining unit configured to synthesize a quadrature amplitude modulation (QAM) signal by combining M QPSK signals respectively output from the M amplifiers at a terminating end, wherein at least one of the M amplifiers comprises:

a divider configured to split the independent QPSK signal received by the at least one amplifier;

a plurality of power amplification units each configured to receive the split QPSK signal from the divider and output the split QPSK signal at a predetermined saturation power; and a combiner configured to combine the outputs from the plurality of power amplification units and output the combined QPSK signal at the preset saturation power of the at least one amplifier.

5. A wireless communication device comprising the high-order QAM transmitter as claimed in claim 4.

* * * * *